Sept. 1, 1970  B. J. CALDWELL, SR., ET AL  3,526,136
MULTIPLE VALVE MECHANISM FOR TESTING INSTRUMENTS
Filed July 8, 1968  3 Sheets-Sheet 1
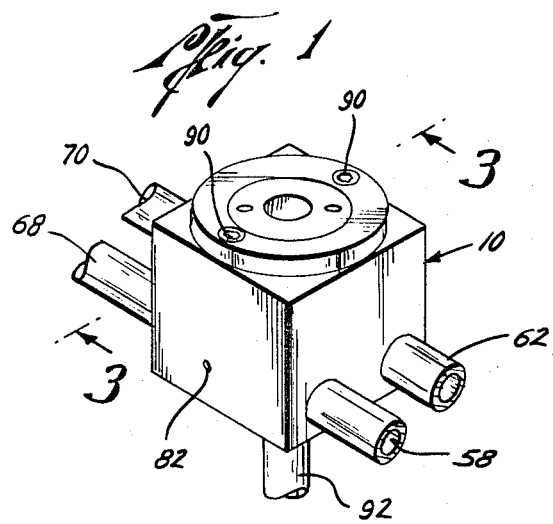
Fig. 1
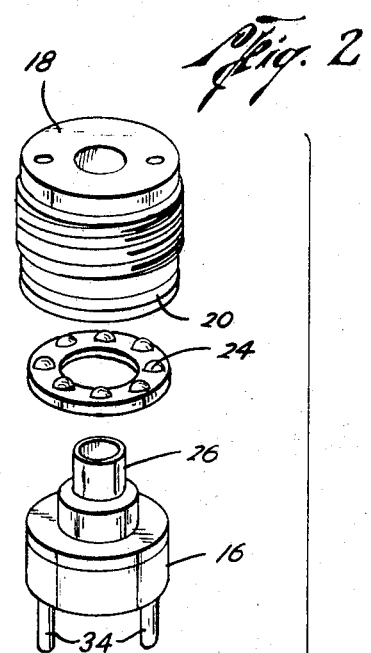
Fig. 2
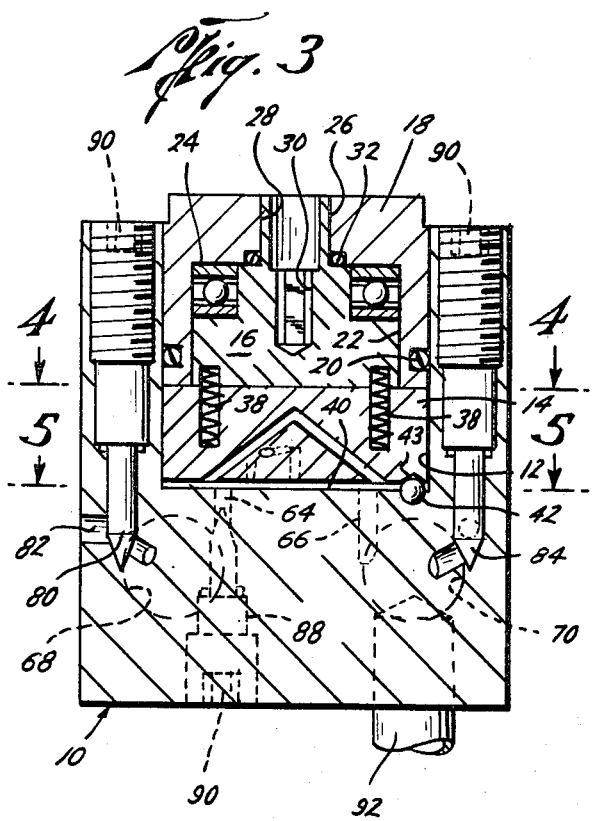
Fig. 3
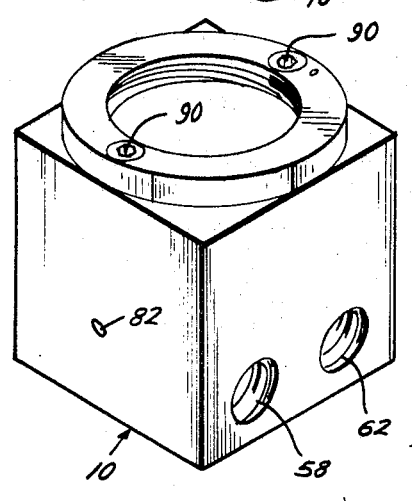
Bruce J. Caldwell Sr.
Carl P. Kriegel
INVENTORS
BY Charles E. Lightfoot
ATTORNEY

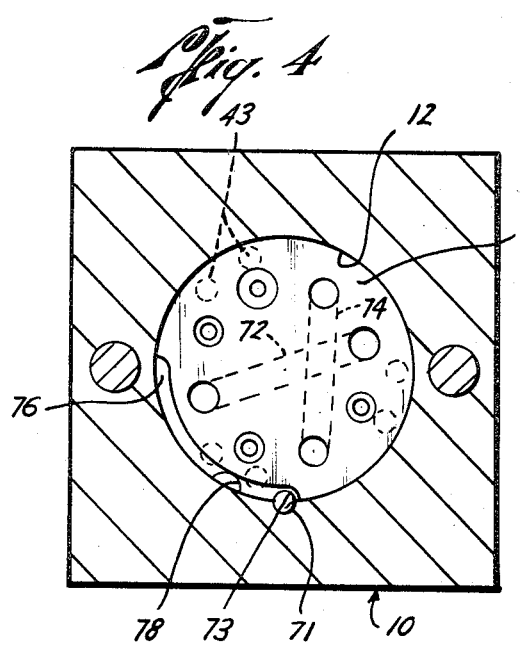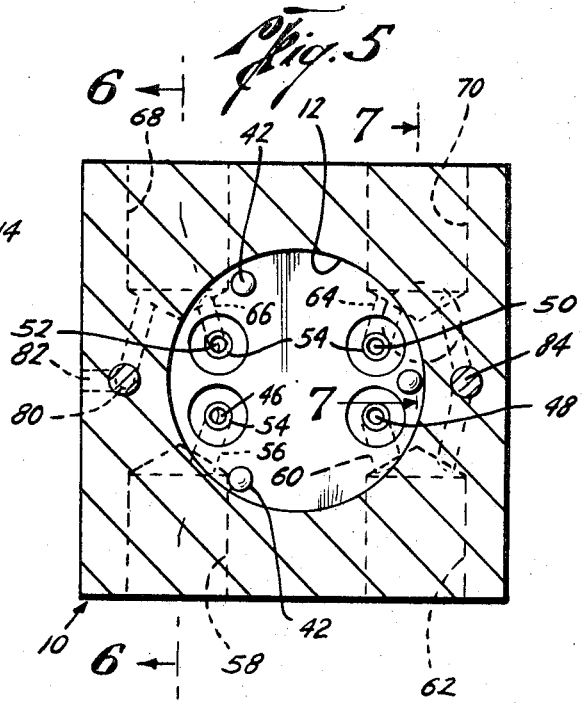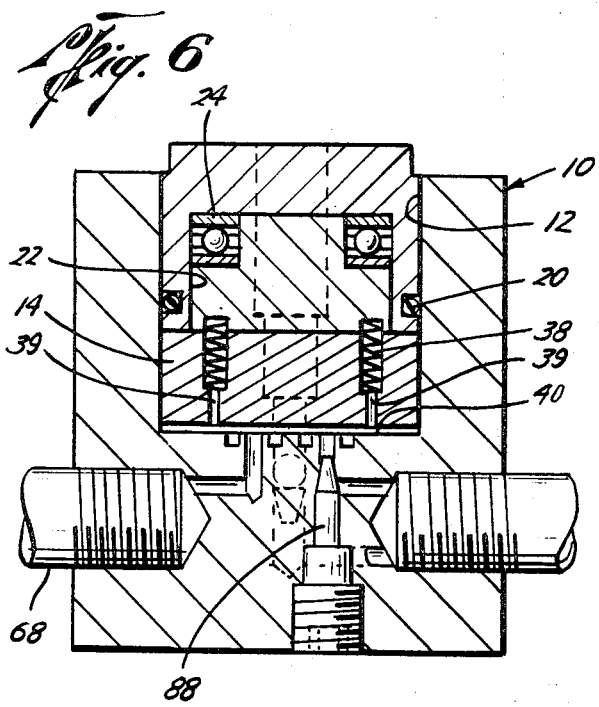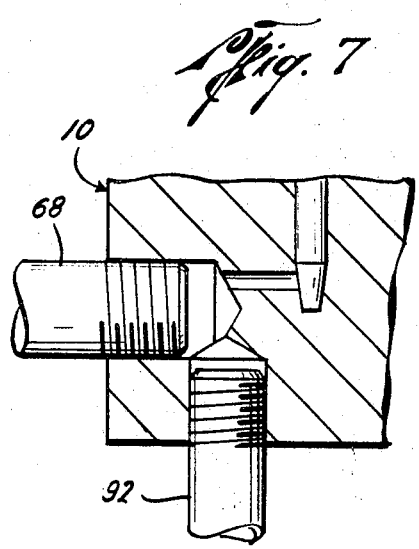

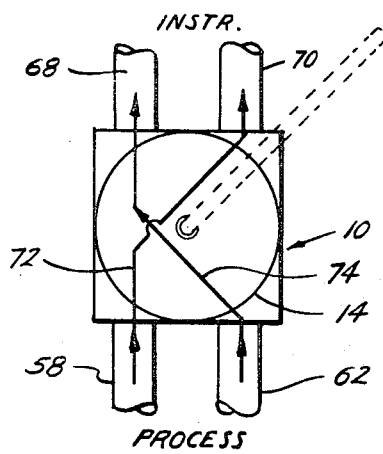
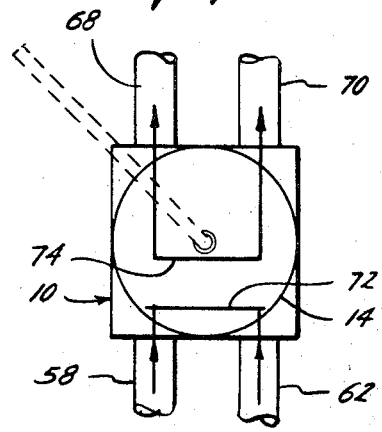
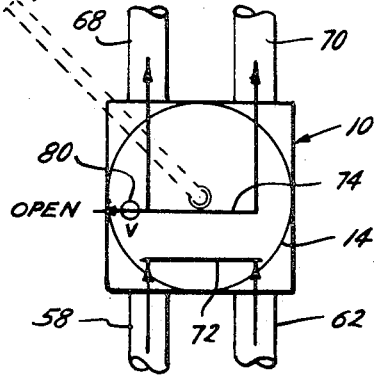
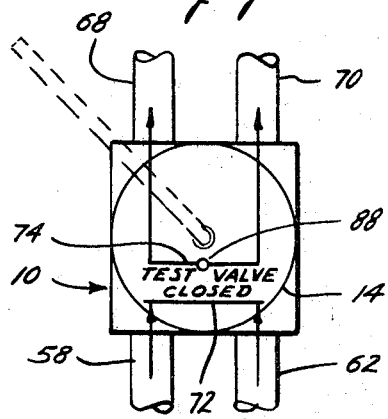
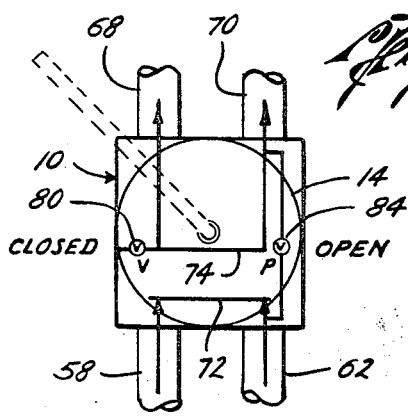
Bruce J. Caldwell Sr
Carl P. Kriegel
INVENTORS
BY
Charles E. Lightfoot
ATTORNEY

United States Patent Office 3,526,136
Patented Sept. 1, 1970

3,526,136
MULTIPLE VALVE MECHANISM FOR TESTING
INSTRUMENTS
Bruce J. Caldwell, Sr., P.O. Box 1081 77001, and Carl
P. Kriegel, 4018 Lockwood Drive 77026, both of
Houston, Tex.
Filed July 8, 1968, Ser. No. 743,156
Int. Cl. G01l 19/00
U.S. Cl. 73—388
6 Claims

ABSTRACT OF THE DISCLOSURE

Valve mechanism for use with testing instruments, such as a manometer for indicating difference in pressure between spaced locations in a fluid flow system. The mechanism has a main valve movable to one position to connect the manometer into the fluid flow system and to another position to shut off or isolate the manometer from the system. Additional valves are provided for bleeding off the pressure from the manometer when isolated from the system preliminary to testing the manometer; for shutting off fluid flow communication between the arms of the manometer to facilitate testing the same, and for gradually repressurizing the manometer before the main valve is again moved to in-service position to place the manometer back in operation in the system. The main valve is constructed to automatically equalize the pressure in the manometer and in the fluid flow system on the moving member of the main valve during movement of the same from one position to the other to render the valve more easily operated.

BACKGROUND OF THE INVENTION

In the separation of fluid flow systems, such as pipe lines, it is customary to make use of fluid flow measuring apparatus such as a manometer which is connected into the system at spaced apart locations between which a difference in pressure is to be measured. Such apparatus frequently includes orifice means, or the like, located in the line between the locations at which the manometer is connected into the line and by which a difference in pressure is produced between the connection upstream from the orifice and the one downstream therefrom.

A number of valves are usually provided in the connection of apparatus of this kind by which the manometer may be placed in operation or in out-of-service condition, whenever desired, other valves being provided at locations to be operated to permit the release of pressure from the manometer while in out-of-service condition and to permit the subsequent connection of the instrument to suitable equipment for testing the accuracy of the manometer. Additional valve means are also included by which repressurizing the instrument prior to placing the same back in service may be accomplished.

The valves of the apparatus are customarily manually operated and due to the number of valves required, the procedure by which the apparatus is placed in or out of service and tested and repressurized becomes complicated, so that a carefully worked out sequence must be followed in opening and closing of the valves in order to avoid mistakes which would result in damage to the manometer or testing instruments or malfunctioning of the equipment.

The present invention has for an important object the provision of valve mechanism including multiple valve means which greatly simplifies the procedure to be followed in carrying out the testing of the fluid flow measuring apparatus and which reduces the likelihood of mistakes in procedure which would result in damage to the apparatus.

Another object of the invention is the provision of multiple valve mechanism embodying unitary valve means designed for operation to place the fluid flow measuring apparatus either in in-service or out-of-service condition and separate valve means which are individually operable to carry out various steps in the releasing of pressure from the apparatus, testing the same, and repressurizing the apparatus.

A further object of the invention is to provide multiple valve mechanism for apparatus of the kind mentioned wherein the various valves and their operating means are constructed and arranged to reduce the possibility of confusion or mistake in the procedure to be followed in placing the apparatus in in-service and out-of-service condition and in performing the various steps in the testing of the same.

A still further object of the invention is the provision of valve mechanism for equipment of the kind referred to wherein the valve means by which the manometer is placed in in-service or out-of-service condition is constructed to provide for equalization of the pressure on the valve during movement of the valve from one to another of its positions whereby pressure of fluid on the valve does not interfere with the operation of the valve.

SUMMARY OF THE INVENTION

Briefly described the valve mechanism comprises a valve block or casing having a main valve bore extending particularly therethrough and provided with inlet and outlet ports opening into the bottom of the bore, and a movable valve member or plug disposed in the bore for rotation and longitudinal movement in the bore and separate passageways positioned to establish communication between each of said inlet ports and one of said outlet ports in an in-service position of rotation of the plug and to shut off such communication in an out-of-service position of rotation of the plug. Yieldable means is provided positioned for coaction with the plug and block to yieldingly urge the plug toward the bottom of the bore, and sealing means is positioned in the bore surrounding each of said ports in position for sealing engagement with the plug and the block in the bottom of the bore when the plug is in its innermost position in the bore. Means is provided in the bore positioned for coaction with the block and plug upon rotation of the plug away from either of said positions of rotation toward the other position of rotation to move the plug away from the bottom of the bore to disengage the plug from and hold the plug out of engagement with said sealing means upon such rotation of the plug to cause equalization of the pressure exerted by the fluid entering the bore from said ports on the plug during such rotation, and to allow the plug to move into sealing engagement with said sealing means when the plug is in either of said positions.

The mechanism includes a vent passageway in the block positioned to be in communication with the open ends of the arms of a manometer connected to said outlet ports and leading to the exterior of the block and a valve for opening and closing said vent passageway. The valve block has a passageway through which communication may be established between the open ends of the arms of the manometer, and is provided with a valve for opening and closing the same, and also has a repressuring passageway through which fluid may flow into the manometer from a fluid flow system, with which the manometer is used, and a valve for controlling the opening and closing of the repressuring passageway to allow the gradual repressurizing of the manometer after the testing of the same in the out-of-service position of the main valve, prior to returning the main valve to the in-service position.

BRIEF DESCRIPTION OF THE VIEWS OF THE DRAWINGS

FIG. 1 is a perspective view on a reduced scale of the multiple valve mechanism of the invention;

FIG. 2 is a perspective view of the valve of the invention showing the various parts in disassembled relation;

FIG. 3 is a vertical, central, cross-sectional view, taken along the line 3—3 of FIG. 1, looking in the direction indicated by the arrows;

FIG. 4 is a cross-sectional view, taken along the line 4—4 of FIG. 3, looking in the direction indicated by the arrows;

FIG. 5 is a cross-sectional view, taken along the line 5—5 of FIG. 3, looking in the direction indicated by the arrows;

FIG. 6 is a cross-sectional view, taken along the line 6—6 of FIG. 5, looking in the direction indicated by the arrows;

FIG. 7 is a fragmentary cross-sectional view, taken along the line 7—7 of FIG. 5, looking in the direction indicated by the arrows;

FIG. 8 is a diagrammatic view illustrating the in-service position of the valve mechanism when the testing instrument or apparatus is in use;

FIG. 9 is a view, similar to that of FIG. 8, showing the out-of-service position of the valve mechanism when the testing instrument or apparatus is out of use;

FIG. 10 is a view similar to that of FIG. 9, showing the position of the valve mechanism with the testing instrument or apparatus out of operation and the vent valve of the mechanism open, to release pressure from the instrument;

FIG. 11 is a view similar to that of FIG. 9 showing the valve mechanism in the out-of-service position with the test or blocking valve of the testing instrument or apparatus in closed position; and FIG. 12 is a view similar to that of FIG. 9 showing the valve mechanism in out-of-service position with the vent valve closed and the instrument repressuring valve open prior to placing the valve mechanism in the in-service position.

DETAILED DESCRIPTION OF A PARTICULAR EMBODIMENT OF THE INVENTION

Referring now to the drawings in greater detail, the invention is illustrated herein in connection with its use with fluid pressure measuring apparatus, such as a manometer of a conventional type, such as a U-tube, bellows, diaphragm, or the like, whose arms are connected at their open ends to separate pressure supply pipes by which fluid under pressure is supplied to the manometer from spaced apart locations of a source of pressure fluid, such as a pipe line, between which a difference in pressure is to be measured.

The valve mechanism of the invention comprises a valve block or housing generally designated 10, which in the present illustration is of generally cubical shape, having a central bore 12 open at one end and extending partly through the block from one face thereof, and within which a main valve member or diverter 14 is rotatably disposed.

The member 14 is adapted to be rotated by an actuator element 16, which is rotatably mounted in a removable head or closure member 18, extending into and closing the bore 12 and threadably secured therein, and which carries suitable seal forming means, such as an O-ring 20, disposed in an annular groove provided therefor and located to form a fluid tight seal between the closure and block in the bore.

The closure 18 has a counterbore 22 into which the actuator 16 is rotatably extended and within which suitable bearing means, such as the ball bearing 24 is located between the actuator and the bottom of the counterbore so that the actuator will turn freely in the counterbore. The actuator 16 also has a stem 26 which extends into a central opening 28 and is provided with a recess 30 at its outer end, as seen in FIG. 3, shaped to fit a suitable tool, such as an inside wrench, by which the actuator may be turned. The stem 26 may be surrounded by suitable seal forming means, such as the O-ring 32 disposed in an annular groove provided for the same, to form a fluid tight seal between the stem and the closure 18.

The actuator member 16 carries one or more driving elements or pins 34 extending inwardly of the bore from its inner end, which extend into suitable openings 36 in the valve member 14 to cause the valve member to rotate with the actuator upon rotation of the same.

Suitable means such as one or more coil springs 38 are disposed between the valve member 14 and the actuator 16 in position to yieldingly urge the valve member toward the bottom 40 of the bore. The valve member 14 may also have one or more pressure equalizing passageways 39 leading from the innermost end face of the member to the outermost end face thereof.

A number of ball bearings 42 are disposed in the bottom of the bore 12 in position for engagement with the valve member and block to hold the valve member in spaced relation to the bottom of the bore during rotation of the valve, and the valve member is formed with a number of spaced apart recesses 43, as shown in FIG. 3, in its inner end face into which the ball bearings 42 may move to allow the valve member to move toward the bottom of the bore when the valve member is in its in-service or out-of-service position.

The valve block 10 has four ports 46, 48, 50 and 52, respectively, opening into the bottom of the bore 12, as shown in FIG. 5, each of which ports is surrounded by an O-ring seal 54 positioned to form a fluid tight seal between the bottom of the bore and the valve member 14 to close the ports when the valve moves toward the bottom of the bore in the in-service or out-of-service position of the valve. By this arrangement the valve member 14 will be lifted away from the bottom of the bore to open all of the ports 46, 48, 50 and 52 during rotation of the valve from one of its positions to the other and will be in sealing engagement with the O-rings 54 of the ports when the valve is in its in-service or out-of-service position.

The block has a passageway 56 leading from the port 46 which is in communication with a pressure inlet pipe 58 from one location in a pressure fluid system, such as a pipe line and a passageway 60 leading from the port 48 and in communication with a pressure inlet pipe 62 from another location of the pressure fluid system in which a difference in pressure is to be measured. Similar passageways 64 and 66 lead from the ports 50 and 52 to outlet pipes 68 and 70, respectively, which are suitably connected to a pressure measuring instrument, such as a manometer of the U-tube type, bellows, diaphragm, or the like, by which a difference in pressure may be determined.

The valve member or diverter 14 is provided with separate passageways 72 and 74, best shown in dotted lines in FIG. 4, which in the in-service condition of the apparatus, shown in FIG. 8, connect the inlet pipe 58 with the outlet pipe 70 and the inlet pipe 62 with the outlet pipe 68. In another position of rotation of the valve member 14 the passageways 72 and 74 connect the inlet pipes 58 and 62 in communication and the outlet pipes 68 and 70 in communication, the apparatus then being in out-of-service condition, as seen in FIG. 9.

Within the bore 12 there is an inwardly opening ball recess or socket 71, as best seen in FIG. 4, in which a ball 73 is disposed, which also extends into a circumferentially extending, outwardly opening groove 76 in the valve member or diverter 14, also shown in FIG. 2, to limit rotational movement of the valve. By this arrangement rotational movement of the valve member 14 in one direction will be arrested when the valve reaches the in-service position and in the other direction when the valve reaches out-of-service position. The valve member 14 also has a longitudinally extending, external groove or notch 78, seen in FIG. 2, to facilitate the positioning of the ball 73 in the recess 71 and groove 76 in assembling the valve and to permit the ready disassembling of the same.

A manually operable vent valve 80 is provided in the valve block, which may take the form of a needle valve positioned as shown in FIG. 3, and as seen diagrammatically in FIGS. 10 and 12 and by which the outlet pipes 68 and 70 may be opened to the atmosphere through a discharge port 82, shown in FIG. 3, when the valve mechanism is in out-of-service position to release pressure in the arms of the manometer preparatory to testing the equipment. The vent valve 80 will be closed to prevent the escape of pressure from the manometer when the valve is in in-service position, and also when the manometer is being pressurized, as indicated in FIG. 12, preparatory to placing the equipment in in-service condition.

A repressurizing valve 84, which in the present illustration takes the form of a needle valve is positioned in the valve block at a location to control the flow of fluid through a passageway from one of the inlet pipes, such as the pipe 62 to one of the outlet pipes, such as the pipe 70, as seen in FIGS. 5 and 6, and also diagrammatically in FIG. 12. The repressurizing valve 84 is opened at the close of a testing operation with the equipment in the out-of-service condition to admit pressure gradually from the pressure source in which a difference in pressure is to be measured to the manometer, to avoid damage to the equipment due to a sudden surge of pressure which might result from the movement of the valve member 14 from out-of-service to in-service position without first repressurizing the manometer.

The valve block is further provided with a test valve or blocking valve 88, such as a needle valve, shown in FIG. 6 and diagrammatically in FIG. 11, positioned to control a passageway connecting the outlet pipes 68 and 70 and which, when open establishes fluid flow communication between the arms of the manometer, and when closed shuts off such communication.

The valves 80, 84 and 88 are preferably of the needle valve type, threadably carried in the block 10 and each having an outer end wrench receiving recess 90 by which the valves may be manually operated by a suitable wrench.

A pipe 92 is also connected to the valve block in communication with one of the inlet pipes, such as the pipe 70, as seen in FIG. 3, and to which a suitable pressure gauge may be connected to indicate the line pressure or the pressure of the pressure source. The pipe 92 may be provided with a suitable valve, not shown, or may be plugged when not in use.

In the operation of the valve mechanism of the invention, assuming that the valve member 14 is in the in-service position illustrated in FIG. 8, the inlet pipe 58 will be in communication with outlet pipe 70, and inlet pipe 62 will be in communication with outlet pipe 68, the ball bearings 44 being in certain of the recesses 43 to allow the springs 38 to move the valve member to its innermost position in the bore 12, so that the member is in sealing engagement with the O-rings 54, surrounding each of the ports 46, 48, 50 and 52, thus maintaining the passageways 72 and 74 out of communication with each other and closing the pressure equallizing passageways 39.

With the valve member thus in-service position fluid under pressure from two different locations in a pressure source such as a pipe line will be admitted to the arms of a manometer connected to the outlet pipes 68 and 70 to indicate a difference in the pressure of fluid between the two locations of the line. In this condition of the apparatus the vent valve 80 and repressurizing valve 84 will be closed, while the blocking or test valve 88 will be open.

When it is desired to test the manometer, such as by comparing the same with another manometer or some suitable testing instrument, the valve member 14 is rotated by applying a wrench to the actuator 16 to turn the valve member to its off or out-of-service position, as illustrated in FIG. 9. During rotational movement of the valve member 14 from the in-service to the out-of-service position the balls 44 will ride out of the recesses 43 to lift the valve member off of the O-rings 54, so that the passageways 72 and 74 will be in communication, and equalizing passageways 39 will be open to equalize the pressure on the inner and outer faces of the valve member to allow the member to turn easily. As soon as the valve member reaches the out-of-service position of FIG. 9 the balls 44 will enter others of the recesses 43 to allow the valve member to move inwardly of the bore under the influence of the springs 38, into sealing contact with the O-rings 54 to again close off the passageways 72 and 74 from communication with each other.

The valve mechanism being now in out-of-service condition with the manometer closed off from the pressure in the line and the arms of the manometer in fluid flow communication through passageway 74, the vent valve 80 may then be opened, as illustrated in FIG. 10, to bleed off the pressure in the manometer. Upon releasing of the pressure from the manometer, the vent valve 80 may be reclosed, whereupon the blocking valve 88 may be closed to close off communication between the open ends of the arms of the manometer through the passageway 74, so that the manometer may then be connected to a suitable testing equipment, such as a comparison manometer supplied with pressure from any convenient source to test the condition and accuracy of the equipment. During the testing of the manometer, the vent valve 80 and repressurizing valve 84 will be closed so that the manometer is isolated from the line or other pressure source with which the equipment is used.

When the testing of the manometer has been carried out, the blocking or test valve 88 is opened to reestablish communication through passageway 74 between the open ends of the arms of the manometer and the mechanism is gradually repressurized from the line by opening the repressurizing valve 84 as illustrated in FIG. 12, with the valve mechanism still in out-of-service condition. The gradual repressurizing of the mechanism serves to prevent injury to the equipment which might be caused by the sudden application of full line pressure which would result from the movement of the valve member 14 to in-service position without such repressurizing. It will be apparent that during repressurizing the open ends of the arms of the manometer will be in communication, so that pressure will be applied equally to both arms, thus preventing loss such as the flowing out of mercury from a mercury-type manometer caused by the accidental application of pressure to the arms or damage to manometers of other types. When the mechanism has been thus repressurized, valve 88 is closed and valve member 14 again turned to in-service position of FIG. 8, the pressure on the valve member being equalized as previously described during rotation of the valve member.

In order to more certainly distinguish the main valve, by which the apparatus is placed in either in-service or out-of-service condition, from the vent valve, blocking or testing valve and the repressuring valve, the various valves may be adapted to be operated by wrenches of different sizes, or other suitable means may be employed whereby the likelihood of confusion between the valves will be reduced.

It will thus be seen that the invention constructed as disclosed herein not only provides a means of reducing the number of valves used in the operation of manometer equipment of the kind referred to but also greatly simplifies the testing of such apparatus.

The invention is disclosed herein in connection with a particular construction and arrangement of the parts, which is intended by way of illustration only, it being apparent that various changes can be made within the spirit of the invention.

Having thus clearly shown and described the invention, what is claimed as new and desired to secure by Letters Patent is:

1. Valve mechanism of the rotary plug type comprising
 a housing having a bore extending partly therethrough and a plurality of ports opening into the bore,
 a valve plug movably mounted in the bore for rotation therein and having passageways positioned to be in communication with said ports in one position of rotation of the plug and out of such communication in another position of rotation of the plug,
 seal forming means positioned for coaction with the plug and housing to prevent the flow of fluid from said ports into said bore exteriorly of said plug in either of said positions, said valve having
 an outlet through which fluid may flow from the bore inwardly of said plug to the exterior of the housing and including valve means for opening and closing said outlet.

2. The valve mechanism as defined in claim 1, wherein said housing has a passageway through which fluid may flow from one of said inlet ports to one of said outlet ports when said plug is in a position in which said inlet ports are out of communication with said outlet ports and including valve means for controlling the flow of fluid through said passageway.

3. Valve mechanism of the rotary plug type comprising
 a housing having a bore extending partly therethrough and a plurality of inlet and outlet ports opening into the bore,
 a valve plug movably mounted in the bore for rotation therein and having passageways each positioned to be in communication with one of said inlet ports and one of said outlet ports in one position of rotation of the plug and out of such communication in another position of rotation of the plug,
 seal forming means positioned for coaction with the plug and housing to prevent the flow of fluid from said ports into said bore exteriorly of said plug in either of said positions, having a passageway through which fluid may flow from one to another of said outlet ports to equalize the pressure in said outlet ports when said inlet ports are out of communication with said outlet ports, and including means for opening and closing said equalizing passageway.

4. In apparatus for indicating a difference in the pressure of fluid at spaced apart locations in a pressure fluid system,
 a valve of the rotary plug type having a housing provided with a bore extending partly therethrough and inlet and outlet ports opening into the bore,
 means for connecting separate ones of said inlet ports in communication with said system at said spaced apart locations,
 means for connecting said outlet ports to a pressure differential measuring instrument,
 a valve plug movably mounted in the bore for rotation therein and having passageways each positioned to be in communication with one of said inlet ports and one of said outlet ports in one position of rotation of the plug to supply fluid under pressure from said locations to said instrument and out of such communication in another position of rotation of the plug,
 seal forming means positioned for coaction with the housing and plug to prevent the flow of fluid from said ports into the bore exteriorly of the plug, said housing having an outlet through which fluid may flow from the bore inwardly of said plug to the exterior of the housing, and including means for opening and closing said outlet.

5. The apparatus as defined in claim 4, wherein said housing has a passageway through which fluid may flow from one to another of said outlet ports to equalize the pressure therein when said inlet ports are out of communication with said outlet ports and including means for opening and closing said equalizing passageway.

6. The apparatus as defined in claim 4, wherein said housing has an inlet through which fluid may flow from said system to said instrument when said inlet ports are out of communication with said outlet ports, and including means for opening and closing said inlet.

References Cited

UNITED STATES PATENTS

| | | | |
|---|---|---|---|
| 2,420,785 | 5/1947 | Lorraine | 137—625.47 |
| 2,871,881 | 2/1959 | Hewson | 73—205 X |
| 3,198,015 | 8/1965 | Smith | 73—420 |
| 3,370,612 | 2/1968 | Holl | 137—625.47 |
| 3,381,532 | 5/1968 | Tausch | 73—205 X |

LOUIS R. PRINCE, Primary Examiner

J. W. ROSKOS, Assistant Examiner

U.S. Cl. X.R.

137—625.47; 251—309